United States Patent [19]

De Weerd

[11] Patent Number: 4,935,928
[45] Date of Patent: Jun. 19, 1990

[54] DC SUPPLY FOR AN S-BUS IN ISDN

[75] Inventor: Jan De Weerd, Hilversum, Netherlands

[73] Assignee: AT&T Bell Laboratories, Murray Hill, N.J.

[21] Appl. No.: 308,652

[22] Filed: Feb. 9, 1989

[30] Foreign Application Priority Data

Feb. 25, 1988 [NL] Netherlands ............ 8800481

[51] Int. Cl.<sup>5</sup> .............................. H02J 9/06
[52] U.S. Cl. .................... 370/110.1; 307/64; 323/265; 363/80
[58] Field of Search ............ 363/71, 72, 80; 323/268, 282, 284, 318, 371; 307/43, 64, 65, 80; 370/110.1; 375/36; 379/307, 322, 323, 324; 371/8.1; 455/127, 343

[56] References Cited

U.S. PATENT DOCUMENTS 4,638,175 1/1987 Bradford et al. .............. 307/64
4,805,172 2/1989 Barbe et al. .............. 370/110.1
4,812,672 3/1989 Cowan et al. .............. 307/64

Primary Examiner—Benedict V. Safourek
Attorney, Agent, or Firm—P. Visserman; L. C. Canepa

[57] ABSTRACT

In an ISDN network, terminals connected to an S-bus (4) are fed via this S-bus (4) by a d.c. supply arrangement (6, 7, 20). The d.c. supply arrangement comprises a main supply unit (7) and an emergency supply unit (6) which are coupled with opposite polarity to the S-bus (4) via a coupling circuit (20). Consequently, the emergency supply unit (6) needs to supply only those terminals which are also made suitable for voltages with opposite polarity, and which generally present only elementary telecommunications functions. An electrically arranged coupling circuit (20) includes a monitoring circuit which monitors the value of the main supply unit output voltage and inhibits the output from the main supply unit and connects the emergency supply unit when the output voltage drops below a predetermined threshold.

5 Claims, 2 Drawing Sheets

DC SUPPLY FOR AN S-BUS IN ISDN

BACKGROUND OF THE INVENTION

The invention relates to a d.c. supply arrangement for an S-bus connected to an ISDN network termination, including a first d.c. supply unit supplying a d.c. voltage intended for the S-bus, this unit being fed from a power source which is independent of the ISDN network, and the arrangement including a second d.c. supply unit supplying also a d.c. voltage intended for the S-bus, this second unit being fed from the ISDN subscriber line, the output of the first d.c. supply unit and the output of the second d.c. supply unit being coupled with opposite polarity to the bus via a coupling circuit which connects one of the two d.c. supply units to the S-bus in dependence on the value of the d.c. output voltage of the first d.c. supply unit.

Such a d.c. supply arrangement is known from the "Conference Proceedings Intelec 85", Munich, F.R. of Germany, Oct. 14–17, 1985, pp. 505–512, more specifically FIG. 6 and the associated text.

In an lSDN network, the subscriber line ends in a network termination (NT) at the subscriber's location. At the subscriber's location the NT is connected to one or a plurality of terminals through the S-bus. These terminals usually consist of one or a plurality of telephone sets and, for example, a personal computer (PC).

The terminals are fed through the S-bus by the d.c. supply arrangement connected to the S-bus. Thus, a plurality of terminals, independent of their position on the S-bus, can be fed by a single d.c. supply arrangement.

In this respect it is attractive to provide the d.c. supply arrangement with two d.c. supply units which are fed from mutually independent power sources. If the first d.c. supply unit shows a failure, the second d.c. supply unit can take over the supply to the S-bus. By coupling the second d.c. supply unit to the S-bus with a polarity opposite to that of the first d.c. supply unit it is achieved that the second unit supplies power only to those terminals which have been made suitable for a supply voltage with opposite polarity. This polarity reversal is recommended by the CCITT (Recommendation I. 430, Paragraph 9).

In the aforementioned "Conference Proceedings Intelec '85" the first d.c. supply unit, to be called the a.c./d.c. converter hereinafter, takes its power from the mains. The second d.c. supply unit, to be called the d.c./d.c. converter hereinafter, takes its power from the subscriber line.

The two converters are connected to the S-bus through a coupling circuit. In the "Conference Proceedings Intelec '85" the coupling circuit is formed by a mechanical change-over switch. The positive output conductor of one converter is connected to the negative output conductor of the other converter and also to a conductor of the S-bus. The other two output conductors are connected to different selector contacts of the change-over switch. The main contact of this change-over switch is connected to the other conductor of the S-bus. Thus, the two converters are coupled with the opposite polarity to the S-bus and the aforementioned Recommendation of the CCITT is satisfied.

In addition to the widely known disadvantages of mechanical switches, the mechanical change-over switch forming the coupling circuit is further disadvantageous in that, if the two converters are positioned at a large relative distance, a long feeding line between the converter and the change-over switch will be required in addition to the S-bus. The fact that the converters have to be positioned at a large relative distance occurs, for example, if there is no mains voltage in the neighbourhood of the network termination The invention has for its object to provide a d.c. supply arrangement in which the two d.c. supply units are directly electrically coupled to the S-bus.

To accomplish this, the d.c. supply arrangement according to the invention is characterized in that the two d.c. supply units each comprise a series transistor associated to the coupling circuit, the main current path of this transistor being serially connected to an output conductor of the associated d.c. supply unit, in that the coupling circuit further includes a monitoring circuit with two input conductors which are connected to the output of the first d.c. supply unit and with a control output which is connected to the control electrode of the series transistor associated with this d.c. supply unit to allow the latter to block in case the d.c. output voltage of the d c. supply unit falls short of a preset threshold, and in that the coupling circuit includes a threshold circuit having at least a first and a second input conductor which are connected to the main electrodes of the series transistor associated with second d.c. supply unit and having a control) output which is connected to the control electrode of this series transistor for bringing the latter into the conductive state in case the voltage over the main electrodes of the series transistor falls short of a preset threshold.

By causing the series transistor associated with one d.c. supply unit to assume the blocking state when the series transistor associated with the other d.c. supply unit is in the conductive state, it is achieved that the d.c. supply units do not mutually form a load.

When the first d.c. supply unit (the a.c./d.c. converter) functions in the normal way, the monitoring circuit detects a sufficiently high output voltage of the a.c./d.c. converter. The monitoring circuit renders the associated series transistor conductive causing the a.c./d.c. converter to feed the S-bus.

Since the a.c./d.c converter and the d.c./d.c. converter are coupled with opposite polarity to the S-bus there will be a difference in voltages between the main electrodes of the other series transistor which difference is substantially equal to the sum of the output voltages of the a.c./d.c. converter and the d.c./d.c. converter. The threshold circuit connected to these main electrodes detects this relatively high voltage and causes the series transistor associated with the d.c./d.c. converter to block, so that the d.c./d.c. converter does not form a load for the a.c./d.c. converter.

Once the output voltage of the a.c./d.c. converter falls short of a preset threshold, the monitoring circuit causes the series transistor associated with the a.c./d.c. converter to block. Consequently, the current path between the a.c./d.c. converter and the S-bus is blocked. Owing to this, the a.c./d.c. converter no longer feeds the S-bus.

Consequently, the voltage over the electrodes of the series transistor associated with the d.c./d.c. converter drops to the output voltage of the d.c./d.c. converter. The threshold circuit detects this voltage drop and in response to this renders the associated series transistor conductive. A current path develops between the d.c./d c. converter and the S-bus so that the d.c./d.c. converter feeds the S-bus Because the series transistor associated with the a.c./d.c. converter is blocking, the a.c./d.c. converter does not form a load for the d.c./d.c. converter feeding the S-bus.

A preferred embodiment of the d.c. supply arrangement according to the invention is characterized in that the monitoring circuit comprises a voltage reducer, a voltage reference circuit and a comparator, in which the input conductors of the voltage reducer form the input conductors of the monitoring circuit, in which the output of the voltage reducer is connected to one of the inputs of the comparator to whose other input is connected the voltage reference circuit, and in that the output of the comparator forms the control output of the monitoring circuit.

As is widely known, a voltage reducer can be constituted by, for example, a resistance voltage divider or by a d.c. amplifier having a gain factor smaller than one. The voltage derived from the output voltage of the a.c./d c. converter by the voltage reducer is compared by the comparator to a reference voltage coming from the voltage reference circuit. If the voltage derived from the output voltage exceeds the reference voltage, the comparator will command the control electrode of the associated series transistor such that the latter becomes conductive. In this case the S-bus is fed by the a.c./d.c. converter.

Once the derived voltage drops below the reference voltage, the comparator commands the control electrode of the series transistor such that the latter blocks. The current path between the a.c./d.c. converter and the S-bus is blocked. The S-bus is then no longer fed by the a.c./d.c. converter.

A preferred embodiment of the d.c. supply arrangement according to the invention is characterized in that the threshold circuit comprises a control transistor, a base series resistor and a voltage divider, the voltage divider comprising two input conductors forming the input conductors of the threshold circuit, the output of the voltage divider being connected to the control element of the control transistor, one main electrode of this control transistor being connected to the input conductor of the threshold circuit which is directly connected to an output conductor of the second d c supply unit, the other main electrode of this control transistor forming the control output of the threshold circuit, and in that the base series resistor is arranged between this control output and the other output conductor of the second d.c. supply unit.

As is widely known, a voltage divider can be formed by a resistance voltage divider.

Under normal operating conditions the a.c./d.c. converter feeds the S-bus. As described hereinbefore, there is then a voltage difference over the main electrodes of the series transistor associated to the d.c./d.c. converter. This voltage difference is substantially equal to the sum of the output voltages of the a.c./d.c. converter and the d.c./d.c. converter.

The voltage derived from this relatively high difference in voltages by the voltage divider is applied to the control electrode of the control transistor. The dividing ratio of the resistors in the voltage divider is chosen such that in this case the derived voltage moves the control transistor into the conductive state. Consequently, a relatively large current starts to flow through the main current path of the control transistor and through the base series resistor. Because the control electrode o: the series transistor is connected to the junction of the control transistor and the base series transistor, the voltage difference over the base series resistor due to the relatively high current through the base series resistor causes such a voltage on the control electrode of the series transistor that the latter is blocking. In this case the current path between the d.c./d.c. converter and the S-bus is blocked, so that the d.c./d.c. converter does not form a load for the a.c./d.c. converter.

When the voltage difference over the main electrodes of the series transistor associated with the d.c./d.c. converter drops owing to the fact that the series transistor associated with the a.c./d.c. converter is blocking, which was described hereinbefore, the voltage derived from this difference in voltages by the threshold circuit will drop likewise. Now such a voltage develops on the control electrode of the control transistor that in response thereto the control transistor begins to block. Therefore, no current will flow any longer via the main current path of the control transistor through the base series resistor. The voltage over the base series resistor drops and since the control electrode of the series transistor is connected to the junction of the control transistor and the base series resistor, a current will start flowing through the control electrode, and the series transistor will become conductive. The d.c./d.c. converter will now start supplying power to the S-bus.

A further embodiment of the invention is characterized in that the threshold circuit comprises three input conductors, in that one main electrode of the series transistor associated with the second d.c. supply unit via an emitter series resistor is connected to an output conductor of this d.c. supply unit and in that the junction between the second d.c. supply unit and the emitter series resistor is connected to the third input conductor of the threshold circuit, and in that the threshold circuit comprises a control transistor, a base series resistor and a voltage divider, the latter comprising two input conductors forming the first and the second input conductor of the threshold circuit, the output of the voltage divider being connected to the control electrode of the control transistor, one main electrode of this control transistor being connected to the third input conductor of the threshold circuit, the other main electrode of this control transistor forming the control output of the threshold circuit, and in that the base series resistor is arranged between this control output and the other output conductor of the second d.c. supply unit.

If there is a current path between the d.c./d.c. converter and the S-bus and thus the d.c./d.c. converter feeds the Sbus, the power supplied to the S-bus flows through the emitter series resistor. This power causes a voltage difference over the emitter series resistor. As long as the load resistance connected to the S-bus has a sufficiently large value, this current remains sufficiently small, and the effect of the emitter series resistor is negligible.

When the load resistance assumes too small a value, the current supplied to the S-bus becomes so large as to have the consequent voltage difference over the emitter series resistor render the control transistor conductive. This causes a current to flow via the control transistor through the base series resistor across which this current causes a voltage difference. Consequently, the series transistor becomes less conductive. Therefore, no rise of the current through the series transistor can be realized if the load resistance connected to the S-bus assumes an even smaller value. Thus, the emitter series resistor limits the current flowing through the series transistor to a constant value if the load resistance assumes too small a value.

A further embodiment according to the invention is characterized in that the monitoring circuit further includes a switching transistor whose one main electrode is connected to the input conductor of the voltage reducer which is also connected to the positive output of the first d.c. supply unit and whose other main electrode is connected to the control output of the voltage reducer and whose control electrode is connected to the comparator output.

Once the monitoring circuit detects a sufficiently high output voltage of the a.c./d.c. converter, this monitoring circuit renders the associated series transistor conductive.

Because the control electrode of the switching transistor is connected to the comparator output, the switching transistor will also be rendered conductive.

The control output of the voltage reducer is connected via this conductive switching transistor to the input converter of the voltage reducer to which also the main current path of this switching transistor is connected. The current now flowing through the switching transistor changes the output voltage of the voltage reducer such that the difference between the voltages at the inputs of the comparator is enhanced. Because the series transistor is conductive, the a.c./d.c. converter supplies current to the S-bus. This current may cause a voltage drop over an optional internal resistance of the a.c./d.c. converter. Thereby, the output voltage of the a.c./d.c. converter would drop. The attendant voltage drop at the control output of the voltage reducer is now compensated by the enhancement as described hereinbefore. This achieves that if the a.c./d.c. converter supplies current to the S-bus, the voltage loss over the internal resistance of the a.c./d.c. converter caused by this current does not result in the monitoring circuit causing the series transistor to block again as a consequence of this voltage drop. In this way a hysteresis effect is obtained.

Conversely, when the output voltage of the a.c./d.c. converter falls short of a preset value, the comparator will cause the series transistor and the switching transistor to block. An optional internal resistance will cause the output voltage to rise, which rise is compensated by the :act that the switching transistor begins to block. Thus, also in the opposite direction the monitoring circuit shows a hysteresis effect.

This hysteresis effect is advantageous in that the functioning of the monitoring circuit becomes independent of an internal resistance that is not negligibly small and may be present in the a.c./d.c. converter. In addition, slight fluctuations in the mains voltage around the switching point of the output voltage (which is the value of the output voltage of the a.c./d.c. converter at which the monitoring circuit moves the series transistor from the non-conductive to the conductive state and vice versa) will not result in a constant undesired switching of the series transistor.

BRIEF DESCRIPTION OF THE DRAWING

The invention will be further explained with reference to an embodiment represented in the Figures in which.

DETAILED DESCRIPTION

Figure 1:
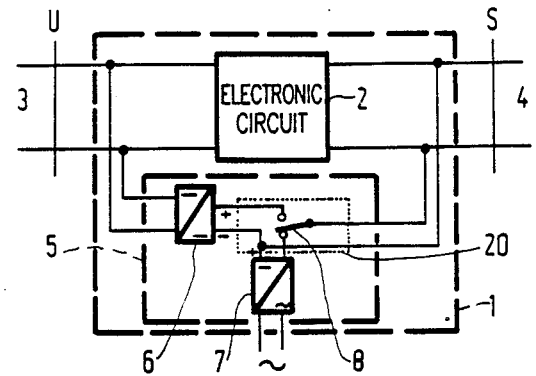
FIG. 1 shows a d.c. supply arrangement according to the state of the art.

The Network Termination 1 represented in FIG. 1 includes an electronic circuit 2 forming the termination of subscriber line 3 (the U-bus) and forming the beginning of the S-bus 4. Terminals (not shown in the Figure) are connected to the S-bus 4. For feeding these terminals, Network Termination 1 further includes a d.c. supply arrangement 5.

The d.c. supply arrangement 5 comprises a d.c./d.c. converter 6, an a.c./d.c. converter 7 and a coupling circuit 20 formed by a mechanical change-over switch. The d.c./d.c. converter 6 is connected with its two input conductors to the two conductors of the subscriber line 3. The a.c./d.c. converter 7 is connected with its two input conductors to the mains. The negative output conductor of the d.c./d.c. converter 6 is connected to the positive output conductor of the a.c./d.c. converter 7 and to one conductor of the S-bus 4. The two remaining output conductors of the d.c./d.c. converter 6 and a.c./d.c. converter 7, respectively, are each connected to a different selector contact of the mechanical change-over switch 8, whose main contact is connected to the other conductor of the S-bus 4.

Under normal operating conditions the mechanical changeover switch 8 has the position shown in the diagram and the a.c./d.c. converter 7 supplies current to S-bus 4. The a.c./d.c. converter 7 converts the a.c. mains voltage into a d.c. voltage intended for the S-bus 4. If the a.c. mains voltage drops too much, the output voltage of the a.c./d.c. converter 7 will drop, the mechanical switch 8 will change-over and the d.c./d.c. converter 6 will assume the supply to the S-bus 4. The d.c./d.c. converter will be fed from the subscriber line 3 and convert the d.c. voltage component occurring there into a d.c. voltage intended for the S-bus 4.

Because the d.c./d.c. converter 6 is an emergency supply unit only feeding S-bus 4 if the main supply unit, that is a.c./d.c. converter 7, has failed, the d.c./d.c. converter 6 need not be able to feed all terminals connected to the S-bus 4. By connecting d.c./d.c. converter 6 to S-bus 4 with a polarity opposite to that of a.c./d.c. converter 7, it is achieved that d.c./d.c. converter 6 supplies current only to those terminals on S-bus 4 that have been made suitable for a supply voltage with opposite polarity. This polarity reversal is recommended by the CCITT.

In the d.c. supply arrangement 5 according to the state of the art represented in FIG. 1 the a.c./d.c. converter 7 and the d.c./d.c. converter 6 are coupled to the S-bus via a coupling circuit 20 formed by the mechanical change-over switch 8.

Figure 2:
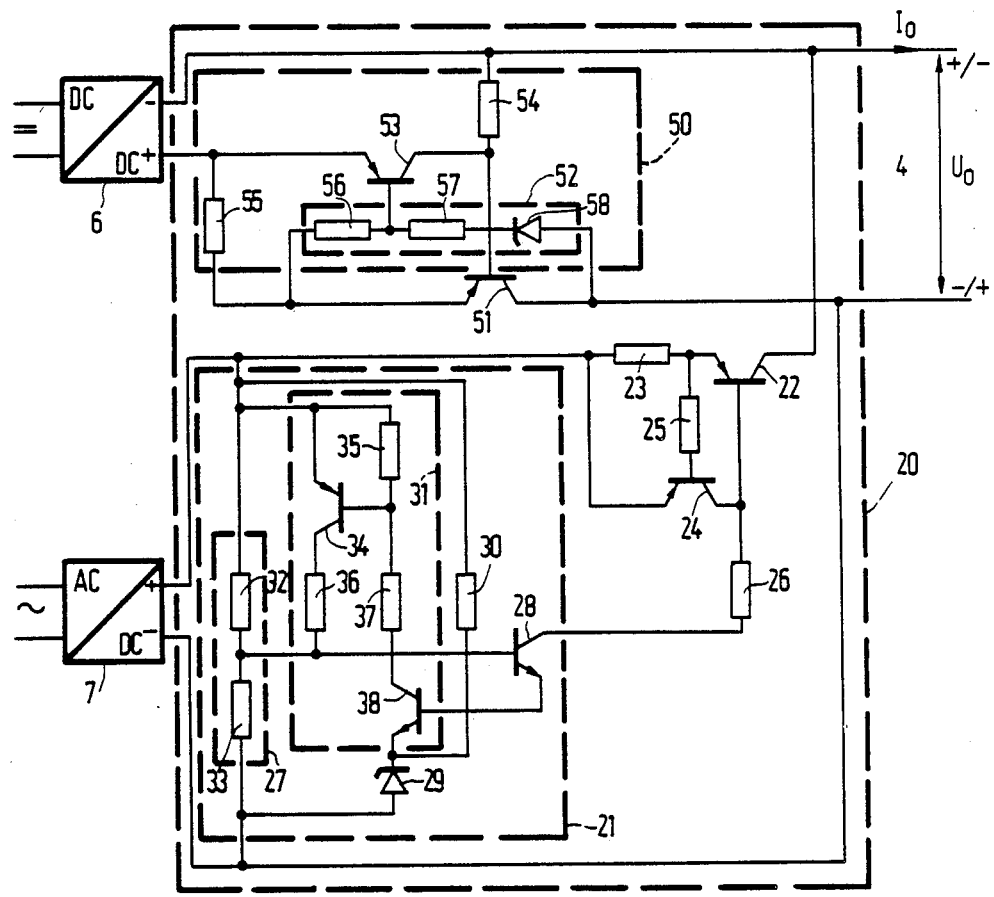
FIG. 2 shows a diagram of the a.c./d.c. converter and the d.c./d.c. converter with the coupling circuit according to the invention.

The coupling circuit 20 according to the invention is represented in FIG. 2.

This coupling circuit 20 comprises a monitoring circuit 21, a series transistor 22 (PNP Darlington), a resistor 23, a transistor 24 (PNP) and the resistors 25 and 26.

The two input conductors of the monitoring circuit are connected to the output conductors of the a.c./d.c. converter 7. The output of the monitoring circuit 21 is connected via resistor 26 to the base of the series transistor 22 whose emitter via resistor 23 is connected to the positive output conductor of the a.c./d.c. converter 7. This emitter is connected via resistor 25 to the base of transistor 24, whose emitter is connected to the positive output conductor of a.c./d.c. converter 7 and whose collector is connected to the base of series transistor 22.

The monitoring circuit 21 comprises a voltage reducer 27, a transistor 28 (NPN) operating as a comparator, a combination of a Zener diode 29 and a resistor 30 operating as a voltage reference circuit and a hysteresis circuit 31.

The voltage reducer 27 includes a series arrangement of the resistors 32 and 33. The junction of this series arrangement forms the output of the voltage reducer and is connected to the base of transistor 28. The two ends of this series arrangement form the input conductors of the voltage reducer 27 and also the input conductors of the monitoring circuit 21. The hysteresis circuit 31 is formed by a switching transistor 34 (PNP), a transistor 38 (NPN) and the resistors 35, 36 and 37. The emitter of the switching transistor 34 and one side of the resistor 35 are connected to the input conductor of the monitoring circuit 21 that is connected to the positive output conductor of the a.c./d.c. converter 7. The base of the switching transistor 34 is connected to the other side of the resistor 35 and via resistor 37 to the collector of transistor 38 whose base is connected to the emitter of transistor 28. The collector of switching transistor 34 is connected via resistor 36 to the output of the voltage reducer 27. The emitter of transistor 38 is connected to the cathode of Zener diode 29 whose anode is connected to the negative output conductor of the a.c./d c. converter 7. The junction of the Zener diode 29 and the emitter of transistor 38 is connected via resistor 30 to the positive output conductor of the a.c./d.c. converter 7. The collector of transistor 28 forms the control output of the monitoring circuit 21.

The coupling circuit 20 further includes a threshold circuit 50 and a series transistor 51 (PNP Darlington). The first two input conductors of the threshold circuit 50 are connected to the emitter and the collector o: the series transistor 51, respectively. The third input conductor of threshold circuit 50 is connected to the positive output conductor of the d.c./d.c. converter 6. The control output of the threshold circuit 50 is connected to the base of the series transistor 51.

The threshold circuit 50 comprises a voltage divider 52, a control transistor 53 (PNP), a base series resistor 54 and an emitter series resistor 55. The emitter series resistor 55 is connected between the positive output conductor of d.c./d.c. converter 6 to which the emitter of control transistor 53 is also connected, and the emitter of series transistor 51 to which also an input conductor of the voltage divider 52 is connected. The other input conductor of the voltage divider 52 is connected to the collector of the series transistor 51.

The output of the voltage divider 52 is connected to the base of the control transistor 53 whose collector forms the control output of the threshold circuit 50 and via base series resistor 54 is connected to the negative output conductor of the d.c./d.c. converter 6.

The voltage divider 52 comprises a series arrangement of the resistors 56 and 57 and a Zener diode 58, in that order. The resistor 56 is arranged between the input conductor of the voltage divider 52, which is connected to the emitter of series transistor 51, and the output of the voltage divider 52. The series arrangement of the resistor 57 and the Zener diode 58 is inserted between this output and the other input conductor of the voltage divider 52, the anode of the Zener diode being connected to the collector of the series transistor 51.

The collector of series transistor 22 is connected to the conductor of the S-bus 4 that is also connected to the negative output conductor of the d.c./d.c. converter 6. The collector of series transistor 51 is connected to the conductor of S-bus 4 that is also connected to the negative output conductor ofthe a.c./d.c. converter 7.

Under normal operating conditions, a.c./d.c. converter 7 furnishes a sufficiently high output voltage. Voltage divider 27 derives from this output voltage a lower voltage which is applied to the base of transistor 28. This transistor 28 compares its base-voltage, which is proportional to the output voltage, to its fixed emitter voltage and thus functions as a comparator. If the base-voltage is sufficiently higher than the emitter voltage, transistor 28 is conductive. The emitter voltage is maintained at a substantially constant level by the series arrangement of the base-emitter junction of transistor 38 and Zener diode 29. Zener diode 29 is maintained in the conductive state via resistor 30, disregarding the conductive state of the transistors 28 and 38.

Thus, if the output voltage of the a.c./d.c. converter 7 is sufficiently high, transistor 28 will be conductive. Transistor 38 will then also be conductive, because a base-emitter current passes through it. As the transistors 28 and 38 are conductive, series transistor 22 becomes conductive and a.c./d.c. converter 7 starts supplying power to S-bus 4 via resistor Z3 and series transistor 22. In this context it is assumed that this current causes a voltage difference over resistor 23 that is not sufficiently high for causing transistor 24 to be conductive.

When transistor 38 is conductive, a current starts flowing through resistors 35 and 36 and the switching transistor 34 becomes conductive. Consequently, a current starts flowing through the resistor 36 so that the value of resistor 32 is apparently reduced. Thereby, the dividing ratio of voltage reducer 27 will rise, so that the output voltage thereof will also rise.

This rise in the output voltage is provided to compensate for any drop in the output voltage. Such a drop could be caused, for example, by an internal resistance of the a.c./d.c. converter 7 over which a voltage loss occurs when current is supplied or by a discharge of an output capacitor when current is supplied. If in this circuit this rise in the output voltage were not provided, the monitoring circuit 21 would forthwith switch off again the series transistor 22 at the beginning of a current supply as a result of the drop in output voltage. Consequently, the supply would be switched on and off continuously and undesiredly. Switching transistor 34, the transistor 38 and resistors 35, 36 and 37 thus cause a hysteresis in the functioning of the monitoring circuit 21.

If transistor 38 is blocking it is still in a position to conduct a certain amount of leakage current. Switching transistor 34 could then be conductive because this leakage current flows as base-current through the switching transistor 34. Resistor 35 is arranged for supplying this (slight) leakage current without causing the switching transistor 34 to be conductive.

If the series transistor 22 is conductive, a.c./d.c. converter 7 supplies current to S-bus 4. As long as the load resistance connected to the S-bus 4 does not assume too small a value, the current supplied to the S-bus 4 is such that via resistor 23 the consequent voltage difference maintains transistor 24 in the blocking state.

If the connected load resistance assumes too small a value, the current supplied to the S-bus 4 is limited to a constant value. The current through series transistor 22 then causes a voltage difference via resistor 23 so that transistor 24 becomes slightly conductive. Consequently, the voltage over resistor 26 will rise so that the series transistor 22 becomes slightly less conductive.

Under normal operating conditions, a.c./d.c. converter 7 supplies current to S-bus 4. This causes a voltage difference to arise on the conductors of S-bus 4. As the now positive conductor of the S-bus 4 is connected to the negative output conductor of the d.c./d.c. converter 6 and the now negative conductor of S-bus 4 is connected to the collector of series transistor 51, there is a voltage difference between the positive output conductor of the d.c./d.c. converter 6 and the collector of the series transistor 51, which difference is equal to the sum of the output voltages of the two converters 6 and 7. This voltage difference is present over the series arrangement of the resistors 56 and 57 and Zener diode 58 and causes, via this series arrangement, a voltage to be present on the base of control transistor 53, which voltage renders this control transistor 53 conductive, so that this control transistor applies current to base series resistor 54, which current causes a voltage rendering the series transistor 51 non-conductive. Consequently, the d.c./d.c. converter 6 does not form any load for the a.c./d.c. converter 7 (disregarding the high-ohmic voltage divider 52).

If the output voltage of the a.c./d.c. converter 7 drops, the output voltage of the voltage reducer 27 directly coupled thereto will also drop. When a threshold of the former output voltage is fallen short of, transistor 28 begins to block. Transistor 38 will block too, so that also transistor 34 will block. Consequently, the dividing ratio of voltage reducer 27 is apparently reduced, so that also the divider output voltage is reduced. This process forms a part of the hysteresis in the operation of the monitoring circuit 21 already described hereinbefore. Because transistor 28 is blocking, series transistor 22 begins to block as well: the a.c./d.c. converter 7 no longer supplies power to the S-bus 4 and, in addition, no longer forms a load for the S-bus 4 as long as transistor 28 continues to block.

Since series transistor 22 is blocking, the voltage difference over the series transistor 51 is reduced to the value of the output voltage of d.c./d.c converter 6. This reduced voltage difference is present over the series arrangement of the resistors 56 and 57 and Zener diode 58 and via this series arrangement causes a voltage to be present on the base of the control transistor 53. This voltage has dropped so far now that this control transistor 53 is no longer conductive. This blocks the current path through the control transistor 53 to the base-resistor 54. Thereby, the voltage over the base series resistor 54 drops by such an amount that series transistor 51 becomes conductive: now the d.c./d.c. converter 6 applies a current to the S-bus 4, the voltage on S-bus 4 caused by the d.c./d.c. converter 6 having a polarity opposite to that of the voltage previously caused on the S-bus 4 by the a.c./d.c. converter.

As long as the load connected to the S-bus 4 has a sufficiently large value, the current supplied by the d.c./d.c. converter 6 is such as to make the consequent voltage difference over resistor 55 insufficient to render control transistor 53 conductive.

If the load resistance assumes a smaller value, the current becomes larger, until the voltage difference over resistor 55 caused by this current renders the control transistor 53 slightly conductive. Consequently, the voltage over the base series resistor having a small value will rise, so that the series transistor 51 becomes slightly less conductive. The current supplied by the d.c./d.c. converter 6 to the S-bus 4 is thus limited to a constant value.

If the load assumes a still smaller value, the voltage on the conductors of S-bus 4 will drop even more at the said constant output current, and the voltage difference between the emitter and the collector of the series transistor 51 will increase. If this voltage difference on the input collectors of voltage divider 52 exceeds the Zener voltage of Zener diode 58, the latter will become conductive. Consequently, a current will start flowing through the resistors 56 and 57 and Zener diode 58. This current causes a voltage difference to develop over resistor 56 rendering control transistor 53 slightly more conductive. Consequently, a slightly larger current begins to flow through base series resistor 54 from control transistor 53. This causes a slightly larger voltage to develop over base series resistor 54, rendering series transistor 51 slightly less conductive: the main current through series transistor 51 drops ever more according as the voltage across this transistor rises.

If the output voltage of the a.c./d.c. converter 7 becomes sufficiently high again, the monitoring circuit 21 will render the series transistor 22 conductive and a.c./d.c. converter will resume its power supply to S-bus 4. The consequent voltage on the conductors of the S-bus 4, added together with the output voltage of d.c /d.c. converter 6 will appear on the input conductors of the voltage divider 52. Thereby, control transistor 53 becomes conductive again and series transistor 51 begins to block. So, the a.c./d.c. converter 7 resumes its power supply to S-bus 4 and the d.c./d.c. converter 6 no longer forms a load for the a.c./d.c. converter 7.

Figure 3:
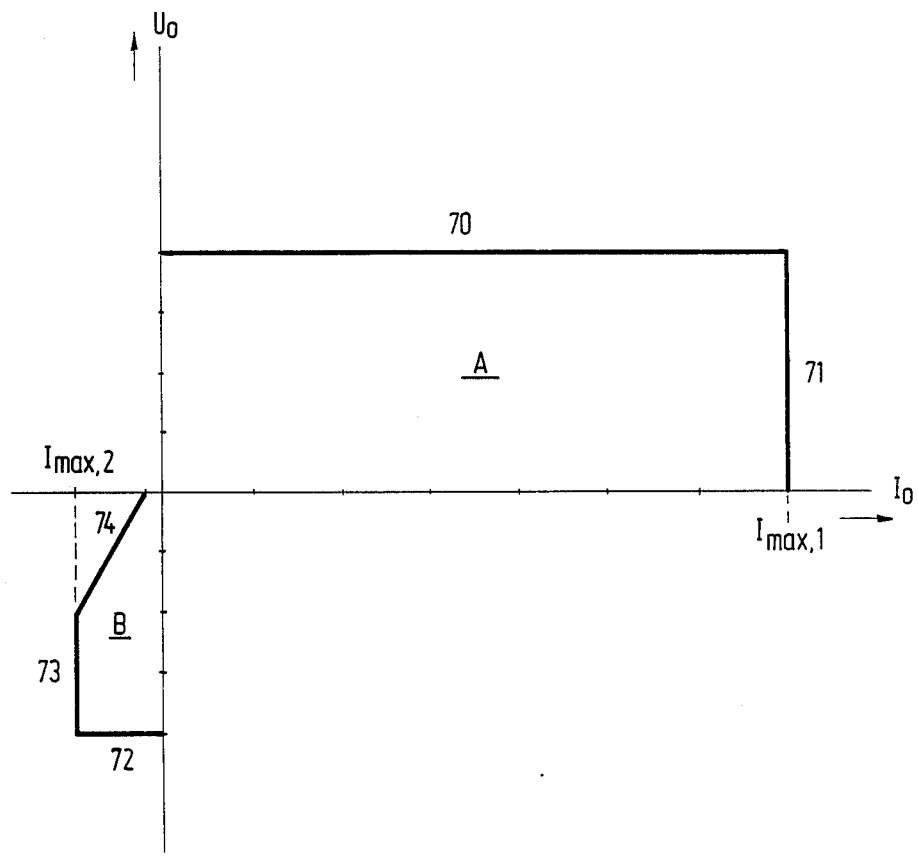
FIG. 3 shows the variation of the output voltage $U_O$ of the supply arrangement according to the invention plotted against its output current $I_O$.

FIG. 3 shows the variation of the output voltage $U_O$ of the d.c. supply arrangement according to the invention plotted against its output current $I_O$. In FIG. 3, working range A represents the power supply to the S-bus 4 by the a.c./d.c. converter 7 and working range B represents the power supply to the S-bus 4 by the d.c./d.c. converter 6. Working range A is bounded by the line sections 70 and 71. Working range B is bounded by the line sections 72, 73 and 74.

When there is a normal output voltage of the a.c./d.c. converter 7 it supplies a current to S-bus 4. As long as this current does not exceed a given value $I_{max,1}$, the d.c. supply arrangement operates as a voltage source having little internal resistance. This situation is represented in FIG. 3 by line section 70 in working area A (because the a.c./d.c. converter 7 supplies current to S-bus 4). When the load resistance assumes too small a value, the output current $I_O$ is limited to the maximum value $I_{max,1}$. This situation is represented in FIG. 3 by line section 71.

When the output voltage of a.c./d.c. converter 7 falls short of a preset value, the associated series transistor 22 will block and the d.c./d.c. converter 6 will begin to supply current to S-bus 4 with reversed polarity. This is represented in FIG. 3 by working range B. As long as this current does not exceed a given value $I_{max,2}$, the d.c. supply arrangement operates as a voltage source with a low internal resistance. This situation is represented by line section 72. When the load resistance is reduced further, the output current $I_O$ is limited by this constant value $I_{max}$, 2. This is represented by line section 3. If the load resistance is reduced still further, the output voltage $U_O$ will continue to drop and hence the voltage over series transistor 51 will rise to beyond the threshold voltage of Zener diode 58. From that point the output current $I_O$ drops in a linear relationship with the output voltage $U_O$. This situation is represented by line section 74 in FIG. 3. The effect of the output current $I_O$ being folded back, indicated by line section 74, is that the series transistor 51, for example, in case of a short-circuited S-bus 4 dissipates far less power than would have been the case without this folding back of the output current $I_O$.

In the coupling circuit as shown in FIG. 2 the components have the following values:

| Type of component | Number of component | Value |
|---|---|---|
| resistor | 23 | 3.3 ohms |
| resistor | 25 | 10 kohms |
| resistor | 26 | 47 kohms |
| resistor | 30 | 22 kohms |
| resistor | 32 | 38.3 kohms |
| resistor | 33 | 10 kohms |
| resistor | 35 | 10 kohms |
| resistor | 36 | 51 kohms |
| resistor | 37 | 47 kohms |
| resistor | 54 | 470 kohms |
| resistor | 55 | 24 ohms |
| resistor | 56 | 10 kohms |
| resistor | 57 | 390 kohms |
| Zener diode | 29 | 10 V breakdown voltage |
| Zener diode | 58 | 22 V breakdown voltage |

I claim:

1. A d.c. supply arrangement for an S-bus connected to an ISDN network termination, including a first d.c. supply unit supplying a d.c. voltage intended for the S-bus, this unit being fed from a power source which is independent of the ISDN network, and the arrangement including a second d.c. supply unit supplying also a d.c. voltage intended for the S-bus, this second unit being fed from the ISDN subscriber line, a coupling circuit which connects one of the two d.c. supply units to the S-bus in dependence on the value of the d.c. output voltage of the first d.c. supply unit, the output of the first d.c. supply unit and the output of the second d.c. supply unit being coupled with opposite polarity to the bus via the coupling circuit, the d.c. supply arrangement is characterized in that the two d.c. supply units each comprise a series transistor associated with the coupling circuit, the main current path of each of the series transistors being serially connected to an output conductor of the associated d.c. supply unit, in that the coupling circuit further includes a monitoring circuit having input conductors connected to the output of the first d.c. supply unit and having a control output which is connected to the control electrode of the series transistor associated with the first d.c. supply unit to allow the series transistor associated with the first d.c. supply unit to block the first power supply from supplying a d.c. voltage to the S-bus in case the d.c. output voltage of the first d.c. supply unit falls short of the preset threshold, and in that the coupling circuit includes a threshold circuit having at least a first and a second input conductor which are connected to the main electrodes of the series transistor associated with the second d.c. supply unit and having a control output which is connected to the control electrode of the series transistor associated with the second d.c. supply for bringing the latter into the conductive state in case the voltage over the main electrodes of the series transistor associated with the second d.c. supply falls short of a preset threshold.

2. A d.c. supply arrangement as claimed in claim 1 characterized in that the monitoring circuit comprises a voltage reducer comprising input conductors and a control output, a voltage reference circuit and a comparator, in which the input conductors of the voltage reducer form the input conductors of the monitoring circuit, in which the output of the voltage reducer is connected to one of the inputs of the comparator to whose other input is connected the voltage reference circuit, and in that the output of the comparator forms a control output of the monitoring circuit.

3. A d.c. supply arrangement as claimed in claim 1, characterized in that the threshold circuit comprises a control transistor, a base series resistor and a voltage divider, the voltage divider comprising two input conductors forming the input conductors of the threshold circuit, the output of the voltage divider being connected to the control electrode of the control transistor, one main electrode of this control transistor being connected to the input conductor of the threshold circuit which is directly connected to an output conductor of the second d.c. supply unit, the other main electrode of this control transistor forming the control output of the threshold circuit, and in that the base series resistor is arranged between this control output and the other output conductor of the second d.c. supply unit.

4. A d.c. supply arrangement as claimed in claim 1, characterized in that the threshold circuit comprises three input conductors, in that the power supply arrangement comprises an emitter series resistor for connecting one main electrode of the series transistor associated with the second d.c. supply unit to an output conductor of the second d.c. supply unit and in that the junction between the second d.c. supply unit and the emitter series resistor is connected to the third input conductor of the threshold circuit, and in that the threshold circuit comprises a control transistor, a base series resistor and a voltage divider, the latter comprising two input conductors forming the first and the second input conductor of the threshold circuit, the output of the voltage divider being connected to the control electrode of the control transistor, one main electrode of this control transistor being connected to the third input conductor of the threshold circuit, the other main electrode of this control transistor forming the control output of the threshold circuit, and in that the base series resistor is arranged between this control output and the other output conductor of the second d.c. supply unit.

5. A d.c. supply arrangement as claimed in claim 2, characterized in that the monitoring circuit further includes a switching transistor whose one main electrode is connected to an input conductor of the voltage reducer which is also connected to the positive output of the first d.c. supply unit and whose other main electrode is connected to the control output of the voltage reducer and whose control electrode is connected to the comparator output.

* * * * *